United States Patent

Renner et al.

[15] 3,648,086
[45] Mar. 7, 1972

[54] STARTER GENERATOR CONSTRUCTION

[72] Inventors: Charles F. Renner, Erie, Pa.; Norman J. Lipstein, Schenectady, N.Y.

[73] Assignee: General Electric Company

[22] Filed: Aug. 7, 1968

[21] Appl. No.: 750,909

[52] U.S. Cl. ...................................310/63, 310/64, 310/227
[51] Int. Cl. ..................................................H07k 9/06
[58] Field of Search....................310/62, 63, 64, 65, 227, 58, 310/59

[56] References Cited

UNITED STATES PATENTS

| 2,604,501 | 7/1952 | Wightman | 310/63 |
| 2,457,967 | 1/1949 | Abbott | 310/63 |
| 2,519,065 | 5/1950 | Reardon et al. | 310/62 |
| 2,970,233 | 1/1961 | Penney | 310/63 |
| 1,920,315 | 8/1933 | Myers | 310/63 |
| 1,549,756 | 8/1925 | Farmer | 310/62 |
| 1,551,295 | 8/1925 | Fletcher | 310/62 |
| 2,993,449 | 8/1961 | Havland | 310/62 X |
| 2,454,120 | 11/1948 | Atwell et al. | 310/59 |
| 2,693,543 | 11/1954 | Martin et al. | 310/227 |

FOREIGN PATENTS OR APPLICATIONS

| 845,667 | 8/1952 | Germany | 310/63 |

Primary Examiner—J. D. Miller
Assistant Examiner—B. A. Reynolds
Attorney—I. D. Blumenfeld, Frank L. Neuhauser, Oscar B. Waddell and Melvin M. Goldenberg

[57] ABSTRACT

A dynamoelectric machine which is comprised of a stator, a rotor which includes an armature and a commutator, a brush rigging associated with said commutator, and a pair of fans for directing cooling air through the stator, rotor, and brush rigging. Radial baffles are provided to more effectively cool the commutator area; a combined bearing support and air baffle aids cooling of a bearing which rotatably supports the rotor; and a foam-filled shroud surrounds the tips of the fan blades to increase the effectiveness thereof.

6 Claims, 9 Drawing Figures

Patented March 7, 1972
3,648,086
2 Sheets-Sheet 1
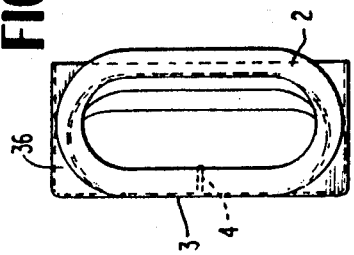
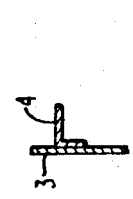
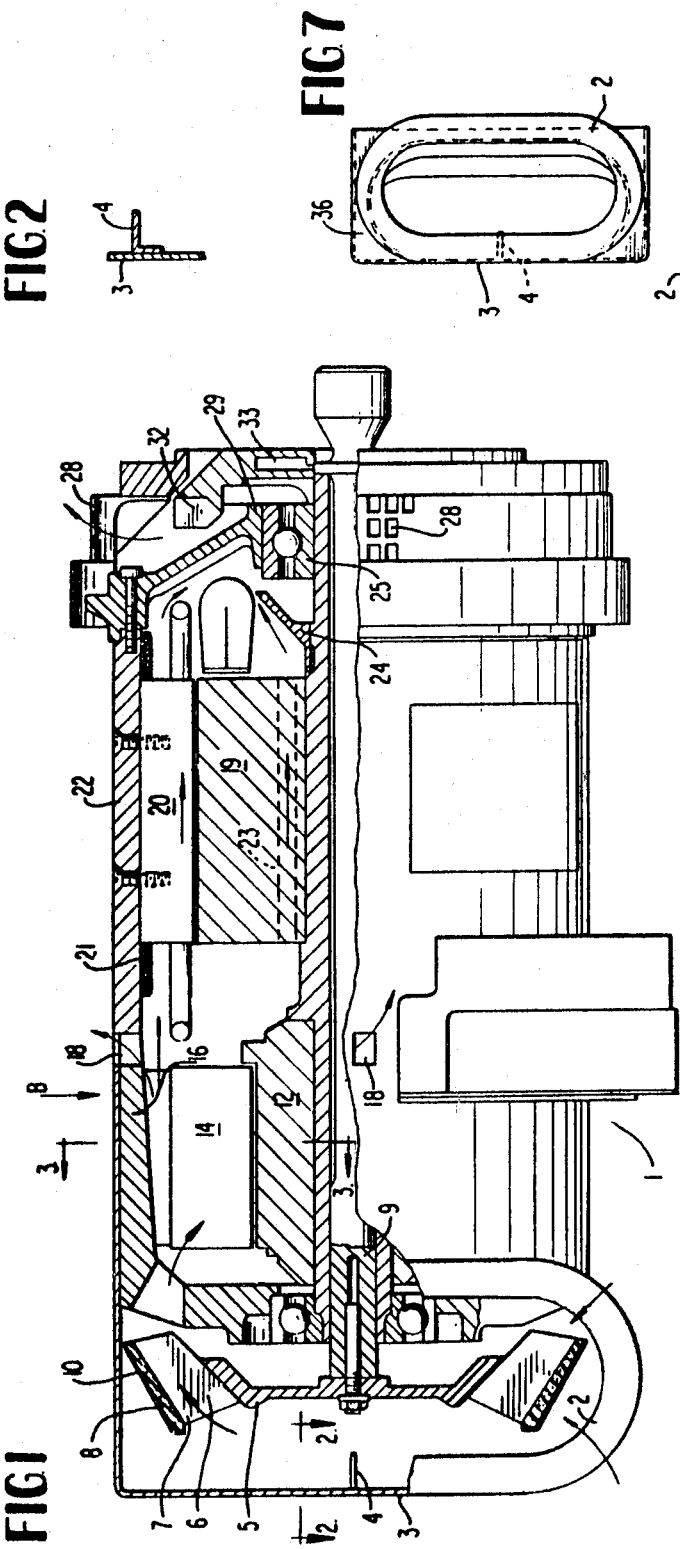
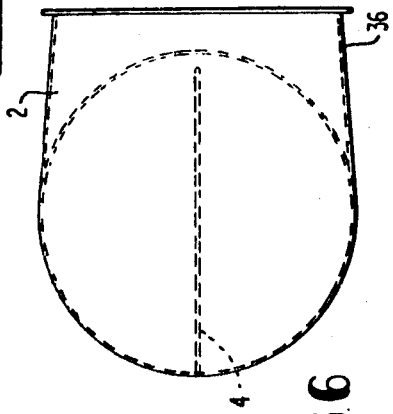
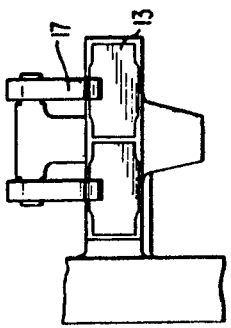
INVENTORS
CHARLES RENNER
NORMAN J. LIPSTEIN
ATTORNEY Patented March 7, 1972 3,648,086
2 Sheets-Sheet 2
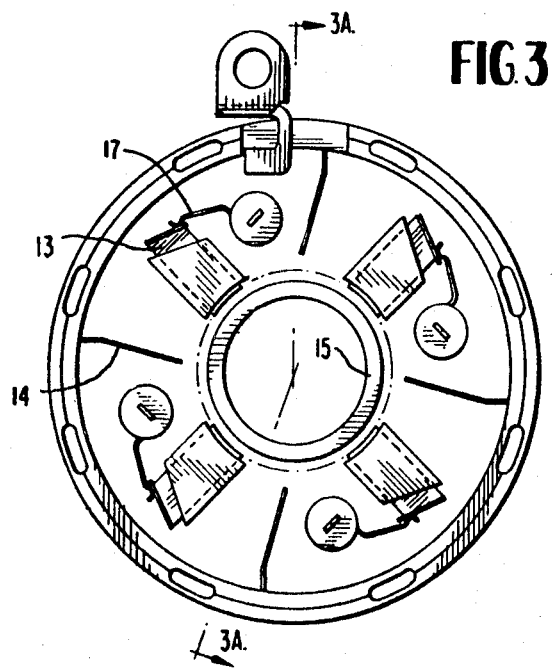
FIG.3
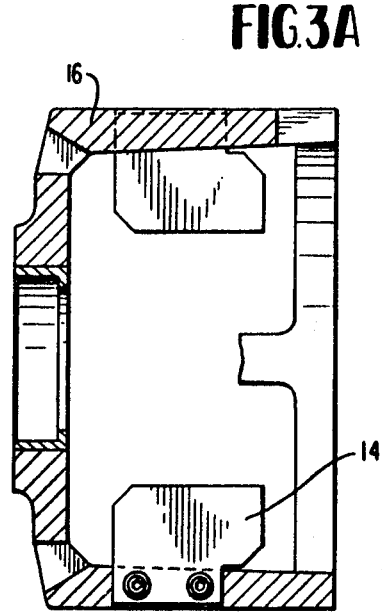
FIG.3A
FIG.4
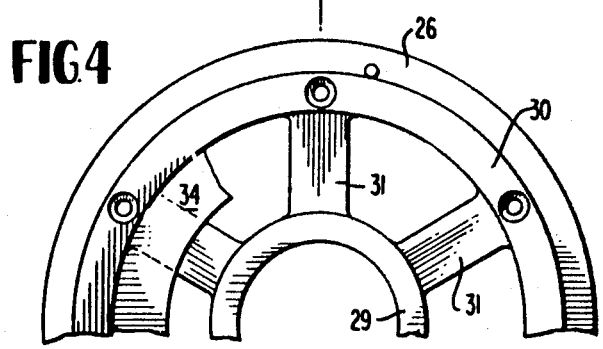
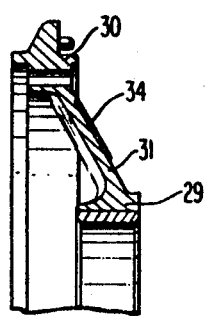
FIG.4A
INVENTORS
CHARLES RENNER
NORMAN J. LIPSTEIN
BY
ATTORNEY 3,648,086

STARTER GENERATOR CONSTRUCTION

BACKGROUND OF THE INVENTION

This invention relates generally to dynamoelectric machines and, more particularly, to an improved construction thereof for increasing the effectiveness of the cooling air flow through such machines.

One problem involved with the design of dynamoelectric machines is the large amount of heat generated therein during the operation of the machine. As a general rule, cooling air is forced through the internal portion of the dynamoelectric machine in order to alleviate this problem. A further problem exists however when the dynamoelectric machine is designed to be utilized on an aircraft. In this type of operation, the size and weight of the dynamoelectric machine become extremely critical. While the amount of heat generated in the operation of the machine remains high, the internal volume which may be given to be used for cooling airflow must necessarily be decreased. In order to force the cooling air through the internal portion of the dynamoelectric machine, a rotating fan is generally incorporated directly into the dynamoelectric machine. One cause of inefficient airflow through the dynamoelectric machine has always been the leakage of air over the tips of the fan blades incorporated into the machine. If this leakage could be stopped and the efficiency of the fan increased thereby, the overall efficiency of the airflow through the dynamoelectric machine would also be increased.

SUMMARY OF THE INVENTION

It is an object of this invention therefore to increase the efficiency of airflow through a dynamoelectric machine by eliminating leakage over the tips of rotating fan blades incorporated into the machine.

It is a further object of this invention to provide a more compact and lighter dynamoelectric machine by increasing the efficiency of the cooling air flow therethrough.

Briefly stated, the objects of this invention are achieved by providing an abradable shroud around the tips of the fan which directs the cooling airflow through the dynamoelectric machine. The effectiveness of the cooling airflow is further increased by providing an antiswirl vane in the air inlet duct and by providing radial baffles to direct the airflow radially inwardly toward the commutator surface and along the sides of the brushes of the dynamoelectric machine. A wound layer-type shunt field coil is incorporated into the machine to provide maximum air space between the poles thereof to further increase the efficiency of the cooling airflow. Baffles are also included in the machine to direct cooling air around the bearings which support the main shaft of the machine.

BRIEF DESCRIPTION OF THE DRAWINGS

While the specification concludes with claims particularly pointing out and distinctly claiming the subject matter which I regard as my invention, a preferred embodiment is disclosed in the following detailed description taken in connection with the accompanying drawing in which:

FIG. 1 is a side elevational view, partly in section of a starter generator incorporating the improved cooling flow pattern of my invention;

FIG. 2 is a partial, enlarged sectional view of the antiswirl divider;

FIG. 3 is a partial sectional view of the commutator area taken along line 3—3 of FIG. 1;

FIG. 3a is a sectional view of the commutator area taken along line 3A—3A of FIG. 3;

FIG. 4 is a partial plan view of the drive end bearing support and air baffle;

FIG. 4a is a sectional view taken along line 4A—4A of FIG. 4;

FIG. 5 is a plan view of the brush rigging taken in the direction of arrow B of FIG. 1;

FIG. 6 is a side plan view of the air inlet cover;

FIG. 7 is a front view of the air inlet cover.

DESCRIPTION OF THE PREFERRED EMBODIMENT

Referring to the figures wherein like numerals represent like parts throughout, FIG. 1 shows, on a partially schematic basis, a dynamoelectric machine incorporating the improved cooling flow pattern of this invention. The general cooling airflow pattern is shown by arrows on this figure. As many of the elements are known in the art, they are shown merely in outline form and will be described only insofar as they are concerned with the cooling airflow pattern. The improvements in the cooling airflow pattern are shown in this figure as incorporated into a dynamoelectric machine of the starter-generator type for use on an aircraft. Machines of this type are used to initially start an aircraft engine and, thereafter, to generate electricity to power auxiliary, onboard equipment. The improvements could, of course, be incorporated into other types of dynamoelectric machines than that described.

In order to more fully understand the invention, the overall design of a starter generator, designated generally by the numeral 1, will be described briefly in connection with FIGS. 1 and 3. The generator 1 includes a front end fan 6 for directing cooling air through the machine. The fan 6 is connected to one end of a shaft 9, which is rotatably supported by a pair of bearings 25. Associated with the shaft 9 are a commutator area 12 and an armature 19, which constitute the rotor part of the generator 1. The commutator area 12 comprises a plurality of brushes 13 supported by a frame 16 and held in rubbing contact with the periphery of a commutator ring 15 by a plurality of springs 17. The commutator ring 15 is rigidly connected to the shaft 9 and rotates therewith. Associated with the armature 19 is a stator which is comprised of a plurality of poles 20 and a field coil 21 attached to a frame or yoke 22. The drive end of the generator 1 includes a second fan 32 which forces the cooling air through a plurality of exhaust openings 28.

Referring now more specifically to the improved cooling flow pattern, as shown in FIG. 1, cooling air initially enters the starter-generator, designated generally by the numeral 1, through a radial air inlet 2. An antiswirl divider 4 is incorporated into the air inlet duct in order to prevent loss of head due to swirling air at the entrance to the fan 6. As best shown in FIG. 2, the antiswirl divider 4 is connected by brazing or welding to an internal wall 3 of the inlet duct 2. The fan 6 is comprised of a plurality of fan blades 7 integrally connected to a rotating disc or fan wheel 5. The disc 5 is connected to the shaft 9, the rotation of which is controlled by operation of the starter-generator 1.

In order to increase the efficiency of the fan 6, an annular shroud 8 surrounds the tips of the fan blades 7. The shroud 8 comprises an annularly metallic member which surrounds the fan blades and is fastened to the internal wall 3 of the device by means of a flange 11. Flange member 11 is fastened between wall 3 and frame 16 by a screw or bolt. The interior of metallic annular shroud 8 is filled with a material which allows sealing action between the shroud and the fan blades. To this end, shroud 8 is filled with an abradable foam material 10 into which the tips of the blades 7 rub. An example of a suitable abradable material is given in Penn application, Ser. No. 748,450, filed July 29, 1968, and assigned to the same assignee as this application. Thus it can be seen that the shroud and the abradable material contained therein are rigidly fastened to the housing of the motor generator. The diameter of the fan blades 7 and of the shroud 8 are designed such that the outer diameter of the fan blades is slightly larger than the inner diameter of the annulus of abradable material which fills shroud 8 thereby the tips of the fan blades 7 actually cut grooves into the abradable material 10. The shroud 8 therefore acts as a very effective seal preventing flow from escaping over the tips of the blades 7. This in turn increases the efficiency of the fan 6.

The air leaving the fan 6 is next directed into the commutator area which is designated generally by the numeral 12. As best shown in FIGS. 3 and 5, the commutator area comprises basically the plurality of carbon brushes 13 which are held in rubbing contact on the outer perimeter of the commutator ring 15 by the plurality of springs 17. A plurality of radial air baffles 14 are attached to the frame 16 which also supports the brushes 13 and the springs 17. The purpose of the baffles 14 is to straighten the flow leaving the fan 6 and to direct it toward the commutator and past the brushes in order to more effectively cool the commutator area. A plurality of bleed holes 18 are provided in the casing just aft of the commutator area in order to permit a certain amount of the cooling air to bleed off at this point. The bleed holes 18 increase the efficiency of the cooling flow in that they increase considerably the total airflow and immediately permit a certain amount of heat to be removed from the commutator area. The function of the baffles 14 and bleed holes 18 is described more fully in Lipstein application, Ser. No. 700,966, filed Jan. 26, 1968, and assigned to the same assignee as the present application.

The cooling air leaving the commutator area next enters the stator and armature area of the starter-generator. The starter-generator 1 incorporates an electromagnetic coil structure similar to that disclosed in Pearson application, Ser. No. 690,951, filed Dec. 15, 1967, and assigned to the same assignee as the present application. As disclosed in that application a plurality of spirally wound, individual wire wafers are stacked upon each other to make up the field coil 21 which fits firmly about the pole piece 20 which has a core portion with a non-rectangular cross section. As shown in FIG. 1, the pole piece 20 is rigidly attached to the yoke or casing 22. By utilizing this type of coil, substantially all of the space at the juncture of the pole piece 20 and the yoke 22 may be filled with the winding 21 while still leaving some room for the flow of cooling air around the main pole structure.

The armature 19 is located adjacent the field poles 20 and contains a series of axial openings 23 for the passage of cooling air in order to more effectively cool the armature 19. The hot air leaving the passage 23 is prevented from striking the rear bearing 25 which supports the drive end of the rotor shaft 9 by a molded fiberglas baffle 24 located directly in front of the bearing 25. In order to effectively cool the bearing 25, a combined bearing support and air baffle 26 is provided. As shown in FIG. 4, the bearing support and air baffle 26 comprises a pair of annular rings 29 and 30 interconnected by a plurality of radial arms 31 on which is mounted a baffle 34 in contact with the outer ring 30. The radial arms 31 and the baffle 34 tend to direct the cooling air leaving the coil 21 towards the housing of the bearing 25, thus cooling the bearing.

The second fan 32 draws the air over the bearing 25 and also increases the total airflow through the entire starter generator. The fan 32 is formed as part of a torsional damper housing 33 and serves a second purpose by drawing heat from the torsional damper (not shown). After leaving the fan 32, the air exits through the plurality of exhaust openings 28.

As can best be seen in FIGS. 6 and 7, the air inlet 2 is enclosed by a cover 36. The cover 36 is designed to provide the radial inlet 2 and to yield a maximum opening 37 just opposite the fan 6. The cover 36 is designed to be as compact as possible while providing this maximum inlet opening. As previously mentioned, the antiswirl divider 4 is connected to the internal wall 3 of the duct to prevent swirling of the air inside of the cover 36.

As can be seen from the above description, a number of features have been added to a basic dynamoelectric machine in order to more effectively cool the dynamoelectric machine, i.e., the improved inlet, the radial baffles 14 in the commutator area, the abradable fan seal 8, the bleed holes 18, the combined bearing support and baffle 26, etc. While these features have been shown incorporated into the starter-generator 1, it should be obvious to one skilled in the art that they could also be incorporated into any similar dynamoelectric machine.

What is claimed as new and desired to be secured by Letters Patent of the United States is:

1. In a dynamoelectric machine which includes a stator, a rotor rotatably supported by a plurality of bearings and including an armature and a commutator, a brush rigging associated with said commutator, a plurality of cooling air passages located in said armature, a plurality of radial air baffles associated with said brushing rigging, and a fan for directing cooling air through said stator, said rotor, and said brush rigging, the improvement which comprises providing a first means for directing said air leaving said passage in said armature away from said bearing and a second means directing said air leaving said stator toward said bearing.

2. A dynamoelectric machine according to claim 1 wherein said first means comprises a molded fiberglas baffle.

3. A dynamoelectric machine according to claim 1 wherein said second means comprises a combined bearing support and air baffle.

4. A dynamoelectric machine according to claim 3 wherein said support and baffle comprises a pair of annular rings interconnected by a plurality of radial, air directing arms, and wherein one of said rings has connected thereto the baffle.

5. A dynamoelectric machine according to claim 1, wherein said fan includes an annular shroud of abradable, foam material.

6. In a dynamoelectric machine which includes a stator, a rotor including an armature and a commutator, a brush rigging, and a fan for forcing cooling air through said machine, the improvement which comprises surrounding the tips of the fan blades with an abradable foam-filled shroud.

* * * * *